United States Patent [19]

Gallo

[11] 4,106,234
[45] Aug. 15, 1978

[54] ARTIFICIAL STEM ASSEMBLY FOR A SHORT STEM CUT FLOWER

[76] Inventor: Joseph Sebato Gallo, 58 Peach St., Walpole, Mass. 02081

[21] Appl. No.: 707,317

[22] Filed: Jul. 21, 1976

[51] Int. Cl.² .............................................. A01G 5/00
[52] U.S. Cl. ...................................... 47/55; 47/41 SS
[58] Field of Search .......................... 47/55, 41, 41 SS

[56] References Cited

U.S. PATENT DOCUMENTS

| 533,644 | 2/1895 | Hell | 47/41 UX |
|---|---|---|---|
| 637,719 | 11/1899 | Elleser | 47/55 X |
| 2,331,440 | 10/1943 | Thomas | 47/55 |
| 2,904,932 | 9/1959 | Seewann | 47/41 |
| 3,018,586 | 1/1962 | Farley | 47/81 X |
| 3,150,462 | 9/1964 | Gallo | 47/55 |
| 3,368,303 | 2/1968 | Tong | 47/41.12 |
| 3,553,889 | 1/1971 | Gallo | 47/55 |
| 3,802,122 | 4/1974 | Dickinson | 47/55 X |

FOREIGN PATENT DOCUMENTS

| 1,064,281 | 8/1959 | Fed. Rep. of Germany | 47/81 |
|---|---|---|---|
| 5,533 | 8/1892 | Switzerland | 47/41.13 |
| 14,685 of | 1892 | United Kingdom | 47/55 |

*Primary Examiner*—Edgar S. Burr
*Assistant Examiner*—Steven A. Bratlie

[57] ABSTRACT

The disclosure comprises an artificial stem for a short stem cut flower such as a cymbidium orchid, which includes a stiff, relatively large exterior tube of a suitable length to support the flower from a base which may be a reservoir consisting of a moistened cake of florist's foam, and a flocked wire centrally disposed within the tube and loosely wrapped along its length with a strip of absorbent cotton. The flocked wire is somewhat longer than the exterior tube to extend at its upper end into the base of the flower, and at its lower end into the moist florist's foam. When the artificial stem is combined with the flower, the flocked wire is thrust up inside the natural, short length stem into the base of the flower. The cotton wrapping covering the upper portion of the flocked wire, having been removed to permit the insertion of the flocked wire up through the natural stem, is now rewound onto the flocked wire over the natural stem up to the base of the flower. The arrangement is such that water is drawn upwardly by the absorbent wrapping from the reservoir into contact with the natural stem which acts in a normal manner to carry the water to the flower. The exterior tube is pushed firmly into place against the base of the flower and the protruding lower end of the absorbent cotton wrapped flocked wire is bent sharply over the bottom rim of the exterior tube to hold the exterior tube more firmly in place.

1 Claim, 4 Drawing Figures

U.S. Patent  Aug. 15, 1978  4,106,234
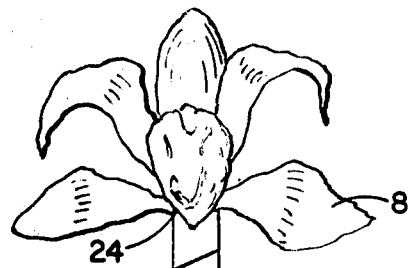
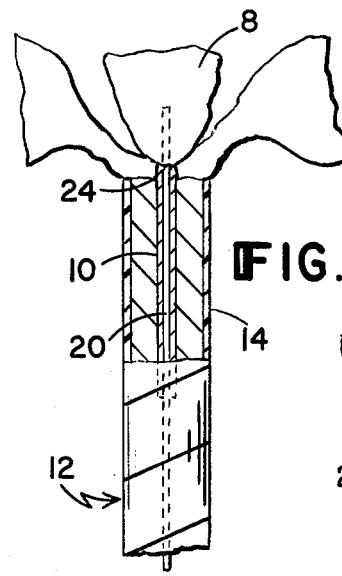
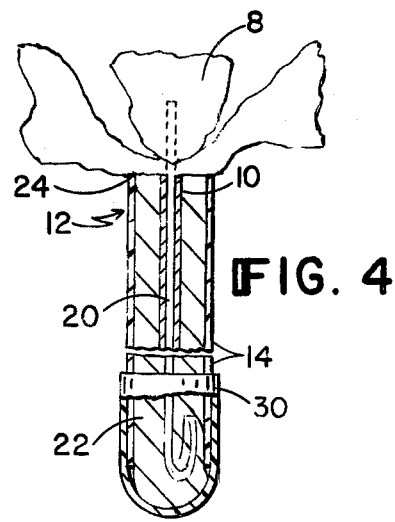
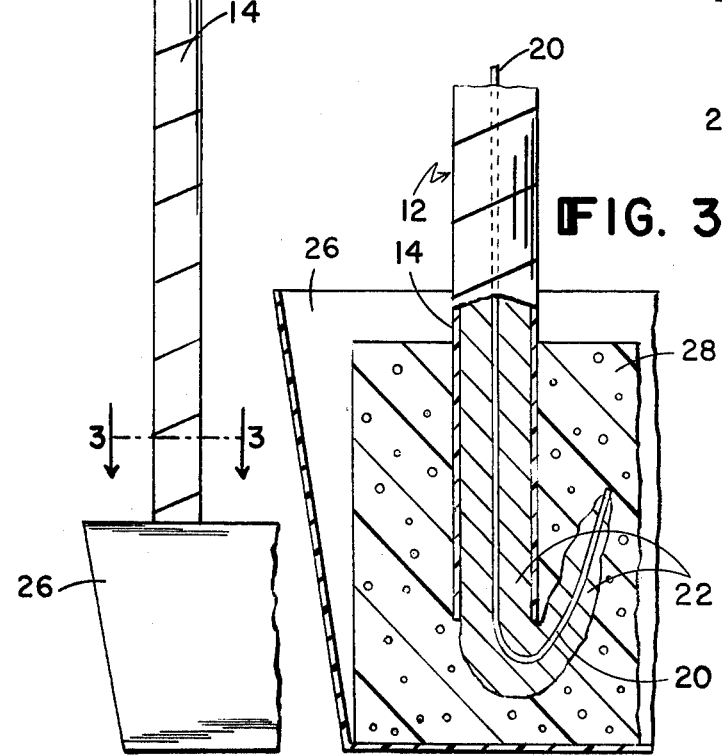

ARTIFICIAL STEM ASSEMBLY FOR A SHORT STEM CUT FLOWER

BACKGROUND OF THE INVENTION

1. Field of the Invention

The present invention relates to an improved artificial stem for a short stem cut flower, including means adapted to provide a continuous and adequate supply of water to the flower from a source connected with the base of the artificial stem.

2. Description of the Prior Art

The present invention is an improvement upon that described and claimed in the inventor's prior U.S. Pat. No. 3,150,462 dated Sept. 7, 1964 for a Fresh Flower Holder. The artificial stem, there disclosed, includes a short length of flocked wire, which extends upwardly into the base of the flower and downwardly into a thick layer of absorbent cotton bunched immediately beneath the base of the flower. The cotton, when moistened, will supply water to the flower through its base for a limited period. The main portion of the artificial stem comprises a relatively stiff plain wire, which overlaps the flocked wire and bunched cotton, and a water-proof cover, which is tightly wound around these elements and extends from the base of the flower to the lower end of the wire. There is no disclosure of any means for replenishing the supply of water to the flower.

SUMMARY OF THE INVENTION

It is a principal object of the invention to provide an artificial stem for a short stem cut flower, which will include therein means for drawing water continuously and in ample amounts upwardly to the flower from a source connected with the lower end of the artificial stem for any desired period of time within the life span of the flower.

It is a further object of the invention to provide a simple and efficient arrangement of the elements of the artificial stem and the flower including the short length cut stem which will facilitate the organization of these parts into a stable, strongly bonded together assembly.

With these and other objects in view as may hereinafter appear a feature of the invention consists in the provision of an artificial stem, which comprises a stiff, large size, preferably waterproof, exterior tube on which the flower is supported, a centrally located flocked wire of a length to extend somewhat from each end of the tube, and a loose wrapping of absorbent cotton around the wire which acts as a wick to carry water up the length of the tube to the flower.

Another feature of the invention consists in the arrangement of the elements of the short stem cut flower and of the artificial stem, when assembled, in accordance with a procedure which includes pushing the exterior tube downwardly with relation to the cotton wrapped flocked wire, removing the cotton wrapping from the upper portion of the flocked wire, forcing the bared portion of the flocked wire upwardly through the short length natural stem into the base of the flower, rewinding the absorbent cotton wrapping over the natural stem up to the base of the flower, and thereafter returning the exterior tube to substantially its original position, in which the upper rim will closely approach the base of the flower.

BRIEF DESCRIPTION OF THE DRAWING

The several features of the invention together with the advantages to be obtained thereby will be readily understood from the following description taken in connection with the accompanying drawing, in which FIG. 1 is a view in elevation of an artificial stem in accordance with the invention, shown life size, supporting a flower with a short length cut stem, and having its lower end immersed in a reservoir;

FIG. 2 is a view in elevation on an enlarged scale, and partly sectioned, of the flower and upper portion of the artificial stem;

FIG. 3 is a view in elevation on an enlarged scale, and mostly sectioned, of the reservoir and lower end portion of the artificial stem; and FIG. 4 is a view in elevation on an enlarged scale of the flower, the artificial stem in section and with the middle portion cut away, and a cap employed to seal in the lower end of the artificial stem.

DESCRIPTION OF THE PREFERRED EMBODIMENT

Referring to the drawing a flower 8, which may, for example, be a cymbidium orchid, is shown. These flowers tend to grow in clusters, each flower having a short stem eminating from a single main stalk. For commercial use in flower arrangements for weddings, funerals and the like it is usual to cut the short stem flowers from the main stalk, and then to mount them on individual artificial stems of suitable length for the particular occasion.

In accordance with the invention the flower 8 is severed from the main stem approximately 2 to 4 inches from the flower, which, together with its short length natural stem 10, is now ready for assembly with the artificial stem 12.

Component parts of the artificial stem 12 include a stiff, exterior tube 14, which may be about five-sixteenths of an inch in diameter. The length of the artificial stem, here shown to be about 8 inches, might vary from about 5 inches to a maximum of 18 inches. The exterior tube may be made of strips of stiff paper, plastic or the like, glued or cemented together, and preferably waterproofed to produce a low cost, serviceable unit. The outside surface of the exterior tube 14, which is also the outside surface of the artificial stem, is preferably colored green to simulate as nearly as possible the natural stem which it replaces. A flocked wire 20 is located within the exterior tube 14, and is of a length to extend about an inch out of each end of the tube. A strip of absorbent cotton 22, or other material having similar properties, is wound loosely about the flocked wire along its length inside the exterior tube. A flocked wire is employed for the reason that the rough surface will provide a frictional contact with engaging portions of the flower and retained short length of natural stem, which helps to prevent slippage or displacement of the flower and natural stem from their proper position on the artificial stem. It will be understood that a chenille or other similar product having a suitably roughened surface may be substituted for the flocked wire shown.

The short stem cut flower 8 and the artificial stem 12, above described, may be assembled into a single, solidly held together unit ready for immediate use in accordance with the following procedure:

The exterior tube 14 is slid downwardly over the cotton wrapped flocked wire 20 to expose a length of said cotton wrapping which includes the length of the short stem of the flower and a further length of the flocked wire 20 which will be pushed up into the base 24 of the flower;

The exposed length of the absorbent cotton 22 is unwrapped from the upper end portion of the flocked wire 20;

The bared upper end of the flocked wire 20 is forced upwardly inside the natural stem 10 into the base of the flower to the dotted line position shown in FIGS. 2 and 4;

The unwrapped portion of the absorbent cotton wrapping is now rewound onto the flocked wire in the original location, but outside the natural flower stem 10 up to and into contact with the base 24 of the flower (see FIGS. 2 and 4);

Next, the exterior tube 14 is moved upwardly over the cotton wrapped flocked wire and overlying natural stem, now located outside the flocked wire in direct contact along its length with the overlying absorbent cotton wrapping. A continuous channel is thus established along which water is drawn upwardly by a natural spreading process from the reservoir through the cotton wrapping and contacting short stem 10 into the flower;

As a last step of the assembly, the lower end of the cotton wrapped flocked wire 20, protruding an inch or more from the bottom of the exterior tube 14, is bent over the bottom rim of the exterior tube to assist in holding the several elements of the assembly firmly in position.

When the flower 8 and the artificial stem 12 are put to use, the lower end of the artificial stem is plunged into a block of moistened florist's foam 28 contained in a reservoir 26. The cotton wrapping exposed on the bent over end of the wire 20 at the lower end of the artificial stem quickly becomes saturated with water, which spreads upwardly into the contacting length of natural stem 10. Water is conveyed along the length of the stem into the base of the flower in the normal way, so that a continuous and adequate supply of water is assured to maintain the flower in a fully watered condition.

FIG. 4 illustrates a convenient device by means of which the flower mounted on its artificial stem 12 may be preserved in storage for an extended period of a month or more before use without deterioration. In order to prepare the assembled flower and artificial stem for cold storage, water is poured into the exterior tube 14 through the open lower end until the absorbent wrapping, natural stem and flower are saturated. The exposed lower end of the cotton wrapped flocked wire 20 is tucked up inside the exterior tube 14, which is then sealed off by means of a cap 30. When the assembled flower and artificial stem are removed from cold storage it is necessary only to remove the cap 30, pull the tucked-in lower end of the cotton wrapped flocked wire 20 out of the exterior tube 14, and return said flocked wire to its bent over position against the rim of the exterior tube in order to place the assembled flower and artificial stem in condition for instant use.

The invention having been described what is claimed is:

1. An artificial stem for a natural short stem cut flower having, in combination,
   a self supporting exterior tube which is straight throughout its length, and which has a diameter greater than the diameter of the stem of the flower;
   a loose wrapping of an absorbent wick material slideably received within said tube; and
   a flocked wire contained within said wick material providing a central core for said artificial stem, said flocked wire extending out of the end of said tube at both ends, one end of said flocked wire being connected to a flower, passing completely through the short stem of the cut flower and into the base of the flower in a direction substantially along the axis of said stem, the lower end of said wire and the wrapping being bent sharply, upwardly over the lower rim of said tube to hold the flower, the flocked wire, and the wick in position relative to said tube.

* * * * *